United States Patent [19]

Bauchot et al.

[11] Patent Number: 6,141,336
[45] Date of Patent: Oct. 31, 2000

[54] TRAFFIC SCHEDULING METHOD, SYSTEM AND ARTICLE OF MANUFACTURE FOR A WIRELESS ACCESS TO AN ASYNCHRONOUS TRANSFER MODE NETWORK

[75] Inventors: Frederic Bauchot, Saint Jeannet; Gerard Marmigere, Drap, both of France; Lazaros Merakos; Nikos Passas, both of Athens, Greece

[73] Assignee: International Business Machines Corporation, Armonk, N.Y.

[21] Appl. No.: 08/970,048

[22] Filed: Nov. 13, 1997

[30] Foreign Application Priority Data

Dec. 13, 1996 [EP] European Pat. Off. ............ 96480113

[51] Int. Cl.[7] .................... H04B 7/212; H04J 3/16; H04L 12/43
[52] U.S. Cl. .................... 370/348; 370/437; 370/461
[58] Field of Search .................. 370/461, 462, 370/321, 322, 329, 326, 337, 345, 346, 347, 348, 449; 340/825.07, 825.08

[56] References Cited

U.S. PATENT DOCUMENTS

| | | |
|---|---|---|
| 4,907,224 | 3/1990 | Scoles et al. ............ 370/437 |
| 5,123,029 | 6/1992 | Bantz et al. ............ 370/347 |
| 5,142,534 | 8/1992 | Simpson et al. ............ 370/346 |
| 5,384,777 | 1/1995 | Ahmadi et al. ............ 370/437 |
| 5,640,395 | 6/1997 | Hamalainen et al. ............ 370/322 |
| 5,644,576 | 7/1997 | Bauchot et al. ............ 370/347 |

*Primary Examiner*—Chau Nguyen
*Assistant Examiner*—Phuongchau Ba Nguyen
*Attorney, Agent, or Firm*—John D. Flynn

[57] ABSTRACT

A method, system and article of manufacture for exchanging data between an asynchronous network and a synchronous network is presented. Data is exchanged between the networks in a sequence of time frames which are partitioned into downlink, uplink and contention periods. These downlink, uplink and contention periods are further divided into time slots, each of which carries either data or control cells between the networks. Cells of data are allocated to the time slots according to their cell deadlines which are proportional to the transmission delay of the network connection over which the cells are to be carried. This cell allocation is then stored in a slot map and communicated to all nodes within the networks in order to facilitate the data transmission.

24 Claims, 6 Drawing Sheets

FH = Frame Header
Dk, Dl, Dm, Dn = Deadlines for Connections ck, cl, cm and cn
Dn+ = Slot following MPDU allocated to Dn or Dn if empty
Dn- = Slot preceeding MPDU allocated to DN or Dn if empty

| * | NEW CELL FOR CN |
| ▨ | OVERHEAD |

O  CONNECTION CK
X  CONNECTION CL
+  CONNECTION CM

LM = Lost Slot allocated to CM if any
Dn + △n = Maximum authorized deadline for CN
Dm + △m = Maximum authorized deadline for CM

* NEW CELL FOR CN
▨ OVERHEAD
O CONNECTION CK
X CONNECTION CL
+ CONNECTION CM

Ln = Lost Slot allocated to CN if any

* NEW CELL FOR CN
▨ OVERHEAD

+ CONNECTION CM      O CONNECTION CK
* CONNECTION CN      X CONNECTION CL

TRAFFIC SCHEDULING METHOD, SYSTEM AND ARTICLE OF MANUFACTURE FOR A WIRELESS ACCESS TO AN ASYNCHRONOUS TRANSFER MODE NETWORK

BACKGROUND OF THE INVENTION

1. Field of the Invention

The invention relates to data communication systems and methods of operation. More particularly, the invention relates to a delay-oriented traffic scheduling method for the control of such communication between an Asynchronous Transfer Mode (ATM) network and a synchronous transfer mode network.

2. Background Art

Recently, ATM and wireless technologies have gained a high visibility as they provide efficient and economical answers to requirements raised by new telecommunication services and by new end-user behaviours.

ATM has been recognised as the common base on which different types of services and network can operate. ATM technology can efficiently combine the transmission of speech, video, hi-fi sound (what is commonly called the multimedia traffic) and computer data into the wired network. Furthermore, ATM has proven to scale well from very high speed network infrastructure (the information highways) to customer premises networks. One of the great advantages of the ATM technology is the fact that it can guarantee some level of service when an ATM connection is set up. Such guarantees can correspond to transmission rate, transmission latency and information loss. Guarantees can be achieved mainly because the ATM architecture assumes that the transmission media are almost error free.

Wireless technology is currently becoming more and more successful as it allows mobile end-users to remain connected to their network and applications while being freed from a wired attachment. Different approaches are currently proposed for wireless communications: they differentiate by the services and the coverage they provide. Wireless Wide Area Networks (WAN) like the so-called Global System For Mobile Communications (GSM) provide nation-wide coverage to the end-user, with modem equivalent transmission speeds. Wireless Data Packet networks provide nation-wide coverage to the end-user, with the Cellular Digital Packet Data (CDPD) transmission services. Finally, Wireless Local Area Networks (LAN) provide establishments wide coverage with conventional LAN (e.g. Ethernet) equivalent communication services.

By marrying these two technologies, wireless ATM networks provide ATM benefits to users working with portable terminals, supporting multimedia applications for mobile users.

But the wireless and ATM technologies significantly differ on several important transmission characteristics:

the wireless channel is a low quality channel in the sense that the typical Bit Error Rate (BER) falls in the range $10^{-3}$–$10^{-5}$, whereas the wired ATM transmission media provide a BER in the range of $10^{-9}$, the nature of the electromagnetic waves is such that any receiver within range of a transmitter beam can get enough energy to receive information sent by the transmitter. Thus, the wireless channel topology must be seen as point-to-multipoint. On the contrary, the wired ATM links have a point-to-point topology, the only technically and economically viable approach with a wireless channel is to use it in half-duplex mode whereas full-duplex transmissions are commonly used on wired ATM networks.

Some known techniques are intended to fill the gap between the wireless and ATM technologies.

A first solution based on high speed point-to-point radio links may meet the requirements of a Wireless ATM network in term of channel capacity, but cannot provide a satisfying answer to other needs. The main limitation is the point-to-point topology preventing wireless end-users to be mobile. In addition, the scheduling policies commonly used on such radio links have not been built to meet the Quality of Service (QoS) requirements of ATM connections.

A solution based on the conventional wireless LAN technique is to some extent in line with some requirements of a wireless access to an ATM network without addressing all of them. Such a solution disclosed in patent publication EP 709 982 is directed to a Medium Access Control (MAC) protocol for wireless access of a plurality of remote stations on a LAN. This system gives a solution to the support of conventional LAN traffic, but cannot guarantee all the QoS requirements imposed by any type of ATM traffic. In addition to this limitation, the design point of traditional wireless LAN products is optimised for conventional LAN traffic (based on large packets: 1.5 Kbytes or more) and therefore presents very poor efficiency figures if packets are replaced by ATM cells.

The best solution is described in the European patent application 96 480047.8 which relates to a MAC protocol for wireless radio frequency access for a plurality of ATM mobile terminals to an ATM access point. This protocol is based on a time division structure in which time is slotted, and time slots are grouped into variable length time frames consisting of downlink time slots and uplink time slots. The variable length time frames consists of three periods (DOWN, UP_RESERVED, UP_CONTENTION). The first period, the DOWN period, is the downlink channel which is used exclusively for data transfer from the Access Point to the Mobile Terminals. The following period, the UP_RESERVED period, is the uplink channel that is used for contention-free data transfer from the Mobile Terminals to the Access Point. The allocation of the time slots in the DOWN and UP_RESERVED periods is performed by the Access Point, and depends on the service class and QoS parameters of each established ATM connection between the Mobile Terminals and any ATM station according to different priority levels derived from the ATM contract parameters. But, such a system does not take into account the cell delay tolerance depending on the arrival time of the cells. In other words, this system takes only the priority to each connection into account based on its service class, but not the delay constraints of the individual connections in the order of slot allocation per connection.

SUMMARY OF THE INVENTION

A primary object of the invention is a delay-oriented scheduling method overcoming the deficiencies of prior systems by using the arrival time of the data cells for determining a deadline of each cell before which the cell has to be transmitted in order to meet a required quality of service.

Accordingly, in a digital communication system comprising a first network based on an asynchronous transfer mode and comprising at least one asynchronous terminal, a second network based on a synchronous transfer mode and comprising a plurality of synchronous terminals and at least a base station having a transceiver for carrying out the exchange of data cells consistently communicating data from the asynchronous terminal to at least one of the plurality of synchronous terminals and data cells from one of the plurality of synchronous terminals to at least one asynchronous terminal, the base station defining a sequence of time frames during which data is exchanged, with each time frame being divided into a down period for contention-free downlink transmission, an up period for contention-free uplink transmission and a contention period for contention-based uplink transmission, a method for scheduling the contents of each time frame, comprising the steps of:

a) allocating slots to the data cells to be exchanged during a connection between one of the synchronous and one of the asynchronous terminals, with said slots being the closest possible in time of a deadline for the connection determined as being the time after which the required quality of service of the connection is not met, b) building the down period by using the cell trains which have been formed for each connection during step a), c) building the up period by using the cell trains which have been formed for each connection during step a), and d) providing a predetermined number of time slots for the contention period.

DETAILED DESCRIPTION OF THE INVENTION

Figure 1:
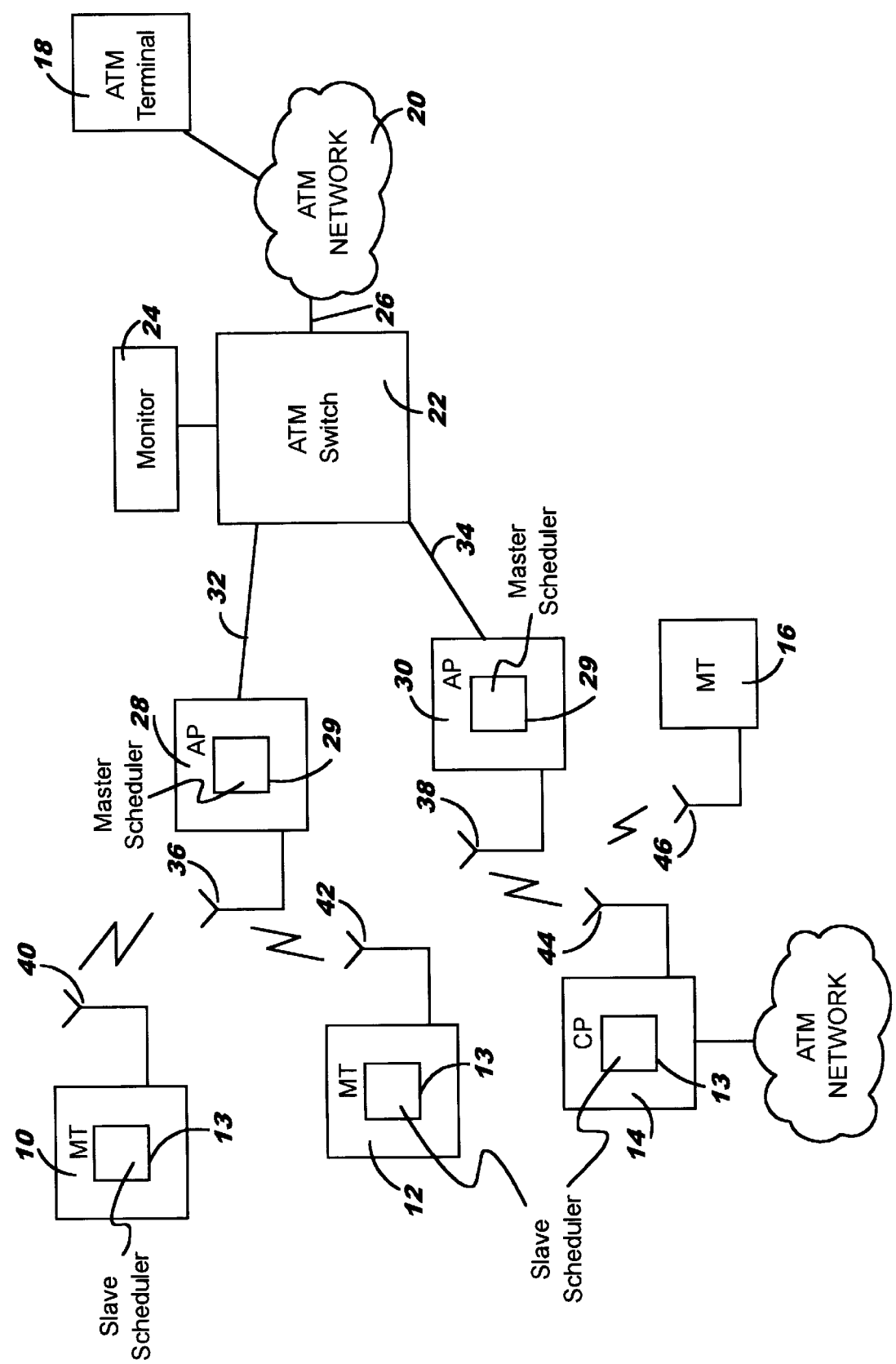
FIG. 1 is a block diagram of a system wherein the scheduling method of the invention is implemented.

Referring to FIG. 1, a wireless network is shown allowing communication between a plurality of Terminals 10, 12, 14, 16 and applications hosted by ATM Terminals such as Terminal 18 belonging to the ATM network 20. A computing system including an ATM Switch 22 or equivalent equipment and the attached monitor station 24 is connected to the ATM network through a conventional ATM link 26, and to Access Points (AP) 28 and 30 through conventional ATM links 32 and 34. These Access Points are featured according to the invention with radio system management functions which coordinate the Terminals access to the shared radio channel.

Each access point 28 or 30 which may be a conventional ATM concentrator or a microcomputer, includes a transceiver provided with an antenna 36 or 38 by which a radio link is established with Terminals 10, 12, 14 or 16.

Terminals 10, 12, 14 or 16 are any type of conventional computer provided also with a transceiver and its antenna 40, 42, 44 or 46 respectively. These terminals are generally Mobile Terminals (MT) like Terminals 10, 12, 16, but also concentrator points like Terminal 14 interfacing with another ATM network 48.

The time frame

The protocol used in the present invention is built around the concept of MAC Time Frame (TF) as disclosed in European patent application 96 480047.8.

As the architecture of the system described in FIG. 1 is unbalanced between MTs and APs, the latter are central points for all wireless communications coming from or ending to MTs, it is thus advantageous to operate the MAC protocol in a hierarchical mode where an AP is a master station and a MT a slave. This mastery is evidenced in the task given to the AP to schedule all traffic flowing on the air, and allocate bandwidth dynamically. The efficient performance of the latter requires knowledge of the real-time needs of all (uplink and downlink) connections. Downlink needs are immediately derived from the arriving downlink ATM cells, while uplink needs are either expressed through reservation requests that are piggybacked in the MAC Protocol Data Units (MPDU) or derived from ATM service and QoS parameters. This technique offers the advantage of avoiding collisions, when accessing the wireless communication medium. To deal with the part of traffic that cannot be anticipated by the AP, a contention-based method must be nevertheless considered. As it suffers from limited channel efficiency (due to collision resolution schemes), the protocol limits the use of the contention-based method to the strict minimum. Regarding the downlink traffic, contention can be avoided as the scheduling responsibility is tied to the AP. For the uplink traffic, contention is only used to issue reservation requests in order to receive (in a subsequent TF) some reserved bandwidth, or to transmit control information.

Figure 2:
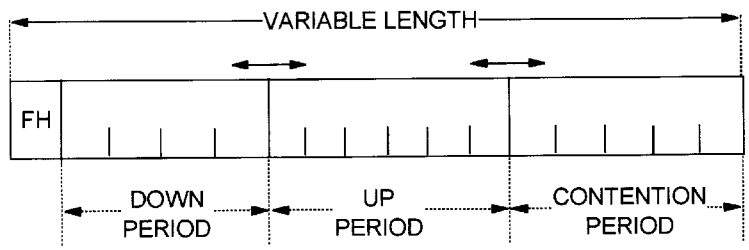
FIG. 2 is a diagram of the time frame used to implement the scheduling method of the invention.

Although it is not part of the present invention, it is necessary to recall that the time frame shown in FIG. 2 starts with a Frame Header (FH) and is composed of three periods of a variable length depending on the instantaneous traffic to be carried out on the wireless channel. For the two periods operating in reservation mode, down and up periods, it is possible that they are empty when no traffic is present. For the third period or contention period, a minimum size is kept to allow any new MT to signal its presence by sending a dedicated control packet. The TF is always beginning with the Frame Header (FH) period which is used to broadcast, from the AP to the MTs, a descriptor of the current TF. As the size of the TF and of its periods can evolve from one TF to the next one, it is necessary that each MT can learn when each period begins and how long it lasts.

Figure 3:
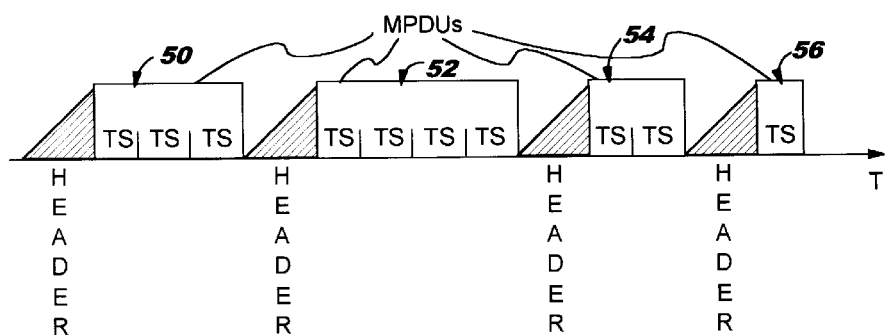
FIG. 3 is a diagram of a sequence of cell trains which are transmitted on a wireless network.

Each TF period is split into a variable number of Time Slots (TS) corresponding to the smallest time granularity. The physical layer overload of the wireless medium is considerably larger than that of wired media. Hence, efficient data transmission can only be achieved if the length of transmitted data packets is not too small. On the other hand, the high BER, characterising the wireless media ask for not-too-large data packets to keep the packet error rate below maximum acceptable values. In the ATM world, the information granularity corresponds to an ATM cell which is 53 bytes long. The protocol defines the concept of "cell train" which is a sequence of ATM cells sent as the payload of a MDPU. As illustrated in FIG. 3, each MPDU is constituted by a MPDU header, followed by a MPDU payload containing ATM cells generated by the same MT/AP. In terms of duration, the time required by the physical layer to initiate a MPDU transmission (referred to as physical header) plus the time needed to send the MPDU header is equal to the transmission time of a single ATM cell. This allows the definition of the time slot size that guarantees high protocol efficiency, whatever the size of a MPDU is. In other words, the size of the time slot has been chosen equal to the time required to transmit a single ATM cell. It is therefore possible to follow the TS-based timing structure, whatever the number of transmitted cells contained in a MPDU. For example, in FIG. 3, the cell train includes 4MPDUs. The first MPDU 50 comprises 3 time slots, the second MPDU 52 comprises 4 time slots, the third MPDU 54 comprises 2 time slots and the fourth MPDU 56 only comprises 1 time slot, each MPDU being preceded by its header H.

The scheduler

This entity which is a program located in the transceiver, is responsible for scheduling the traffic transmitted trough the wireless medium. In other words, it is the component that decides on the time at which a cell will be given to the MPDU handler for the next transmission time period. The information on the assignment of all time slots, together with the relative size of the three periods of the TF, form the slot map. This piece of information is shared with all MTs, as it is broadcast within the FH control MPDU at the beginning of each TF. By recording which time slots are allocated to them, each MT is able to determine when it is allowed to either receive or transmit during the TF. This approach enables therefore efficient power saving capabilities as each MT has the opportunity to enter into some sleeping mode when no traffic is scheduled for it.

There are two kinds of schedulers: a master scheduler 29, which runs in the APs, and a slave scheduler 13 which runs in the MTs. The master scheduler compiles various information, such as the service class and traffic and Quality of Service (Qos) parameters of active ATM connections, and the amount of outstanding traffic, to determine how the TSs of each TF are allocated to the associated MTs. (i.e., it builds the corresponding slot map). With this scheme, a MT is allowed to further identify which part of its outstanding traffic will be sent during the up period. This process is performed by the slave scheduler. In this way, protocol efficiency is optimised since each MT sends, within the TSs allocated to it, the part of its traffic that must be serviced first.

Before the beginning of each frame, the master scheduler must determine the MT that each TS will be allocated to, and formulate the slot map, according to short term requests, traffic characteristics, and QoS agreements. As already mentioned, uplink requests may be piggybacked into the data MPDUs, while downlink requests are immediately derived by the ATM cells arriving in the AP. Since both uplink and downlink share the same radio channel and traffic is usually unbalanced, a single slot allocation mechanism should be used, handling both directions equally. The only thing that differentiates the two directions is that all downlink allocations are performed before all uplink allocations according to the time frame structure.

The scheduler gives a priority to each connection based on its service class. The greater the priority number, the greater the priority of a connection. Additionally, a token pool is introduced for each connection, located at the AP. Tokens are generated at a fixed rate equal to the mean cell rate, and the size of the pool is equal to the "burstiness" of the connection. For every slot allocated to a connection a token is removed from the corresponding pool.

Starting from priority 5 Constant Bit Rate (CBR), and down to priority 2 Available Bit Rate (ABR), the scheduler satisfies requests of the connections of each service class (CBR, rt-VBR or real time Variable Bit Rate, nrt-VBR or non real time Variable Bit Rate and ABR), as long as tokens are available. Unspecified Bit Rate (UBR) connections have no guaranteed bandwidth, thus no token pools are maintained for them. For connections whose traffic can be anticipated by the scheduler, such as CBR, there is no need for transmission of requests from the MT. Therefore, for such connections, the MT does not transmit requests and the scheduler allocates slots to such connections on the basis of anticipated (in other words, the scheduler "generates" imaginary requests for the MT). For the purposes of describing the operation of the scheduler, real and imaginary requests on the uplink, as well as cell arrivals for the downlink will be referred to and treated as "requests".

At every priority class, it is very probable to have more than one connection requesting slots. In that case, the scheduler gradually allocates one slot at a time to the connection (or connections) with the most tokens (i.e., highest token variable), decreasing the token variable by one. The rationale is that the connection with the most tokens has consumed less bandwidth than declared, and thus, has higher priority for getting slots allocated. When the satisfaction of "conforming" requests is completed, and if there are still available slots, the scheduler tries to satisfy "exceeding" requests. At this state, the token variables of all connections requesting slots are less than or equal to zero. The scheduler follows the same procedure as before, starting from priority 5 (CBR), down to priority 1 (UBR). If more than one connection belonging to the same priority class request slots, one slot at a time is allocated to the connection with the highest token variable. Since this is excess traffic, decreasing will result in negative values for the token variables. The procedure stops when all requests are satisfied or all available slots are allocated.

What is not specified with the above algorithm is the exact order of allocation of TSs per MT. To do that, the scheduler should consider the traffic and QoS characteristics of the connections. An arbitrary order of allocation, in accordance with some properties of the protocol, such as cell train construction and uplink/downlink separation, can alter the traffic pattern of a connection. This may result in violation of contractual values of QoS and traffic characteristics, such as Peak Cell Rate (PCR), Cell Delay Tolerance (CDT), and Cell Delay Variation Tolerance (CDVT), and cause discarding of ATM cells deeper in the network, or late arrival at the receiver.

The scheduling algorithm

Cell Delay Tolerance (CDT) values for both the uplink and downlink can only be controlled by a delay-oriented scheduling algorithm that takes into account delay constraints of the individual connections in the order of allocation of slots per connection.

Scheduling in the radio interface should enforce the wireless hop CDT of each connection and allocate slots so that the fraction of ATM cells whose delay exceeds this CDT is minimized. Wireless hop CDT can be evaluated by disassembling end-to-end CDT into CDT for each hop of the ATM connection path. The implementation of a delay-oriented scheduling method requires knowledge of the arrival time of ATM cells in the output queues of the APs and MTs. Due to the location of the master scheduler, the arrival time of downlink ATM cells can be logged and used in the scheduling algorithm. But this is not the case for the uplink ATM cells. Uplink requests are either piggybacked in the data or control MPDUs, or generated by the scheduler (for example for CBR connections). In this way, the exact creation time of the corresponding ATM cells is not specified. Thus, this time should be estimated. For piggybacked requests, if $M_i^T$ is the i-th transmitted MPDU of connection $C_n$, it is assumed that requests in $M_i^n$ correspond to cells created in the interval , $[M_{i-1n}, M_i^n]$. Then, a worst case estimation for the creation time of these cells is $M_{i-1}^n$. The estimated deadline, i.e. the latest time up to which these cells should be transmitted is $W_n$ time units after $M_{i-1}^n$, where $W_n$ is the wireless hop CDT for connection $C_n$.

It must be noted that, for generated requests, their number, arrival time and deadline time are derived from the cell rate and from the last regularly scheduled cell.

From the above, it is clear that the deadline is not an absolute threshold but rather an indication of how quickly an ATM cell should be scheduled for transmission. The scheduler should try to schedule ATM cells before their deadline, but if that is not possible, some maximum extra delay may be allowed.

Construction of cell trains and separation of uplink and downlink periods, inside each frame, play an important role in the operation of the algorithm. In that sense, cell trains are constructed gradually, according to the algorithm based on the priorities, and ordered according to their deadlines. The deadline of a train cell is considered equal to the deadline of its first ATM cell. An ATM cell is attached at the end of the corresponding cell train if this does not cause a deadline violation of the existing cell trains.

The proposed algorithm is based on the principle that, in order to maximize the fraction of ATM cells that are transmitted before their deadlines, each ATM cell is initially scheduled for transmission as close to its deadline as possible. To attain high utilization of the radio channel, the algorithm is "work-conserving", meaning that "the channel never stays idle as long as there are ATM cells requesting transmission". Consequently, the final transmission time of a cell will be the earliest possible given the cell's initial ordering. This way the deadline of a cell in effect determines the transmission order of that cell with respect to the others.

The description of the scheduling method of the invention requires definition of some parameters. For sake of simplicity, all times are measured in slot time units. At the beginning of each frame, the slots following or preceding the frame header are numbered from 1 and −1 respectively and the parameters are adjusted accordingly. If $c_n(i)$ is the i-th cell of a connection $C_n$, the parameters are defined as below:

$a(c_n(i))$=the arrival time of $c_n(i)$. For downlink ATM cells, this is the actual arrival time, while for uplink ATM cells, it is estimated.

$m(c_n(i))$=the maximum waiting time that $c_n(i)$ can wait before being transmitted in the radio interface. Here we assume that $m(c_n(i))=W_n$ which is the same for all ATM cells of connection $C_n$. But the algorithm can also be used for different $m(c_n(i))$'s.

$d(c_n(i))=a(c_n(i))+m(c_n(i))$, the latest time by which $c_n(i)$ can be transmitted without missing its deadline.

$D_n=\min\{d(c_n(i))\}$. $D_n$ is the earliest deadline of all ATM cells of $C_n$ requesting slots in this frame k.

$F_n=0$ if no slots are allocated to connection $C_n$, and the first slot allocated to connection $C_n$ otherwise $L_n=0$ if no slots are allocated to connection $C_n$, and the last slot allocated to connection $C_n$ otherwise $O(x)=0$ if slot x is empty, and n if $F_n \leq x \leq L_n$ (i.e., $O(x)$ is the identifier of the connection that slot x is allocated to)

$$D_n^- = D_n \text{ if } O(D_n) = 0$$
$$= F_{o(Dn)} - 1 \text{ if } O(D_n) \neq 0$$
$$D_n^+ = D_n \text{ if } O(D_n) = 0$$
$$= L_{o(Dn)} + 1 \text{ if } O(D_n) \neq 0$$

$$E_n = \sum_{(i=1)}^{D_n} (O(i) = 0)$$

(i.e., E, is the number of free slots in the interval $[1, D_n]$ $\Delta_n$ is the maximal authorised delay, for connection $C_n$, for allocating slots after the deadline $D_n$.

$N(x)$ is the first empty slot after slot x.

$\Phi$ is the "MPDU overhead": for each MPDU transmitted over the air, a number of $\Phi$ time slots must be reserved for transmission of the Physical and MPDU headers. In the preferred embodiment, this overhead consumes only one slot ($\psi$=1), but it would be possible to take any constant value to this overhead.

P is the "Period overhead": at the boundary between DOWN and UP periods, the RF modem must switch between transmit and receive mode, an operation which lasts some time, equal to P time slots. In the preferred embodiment, this overhead consumes only one slot (P=1), but it would be possible to take any constant value to this overhead.

It is assumed that, at the beginning of each time frame, a number of requests are pending at the scheduler. At the end of the operation, the exact position of the slots allocated for each request should be specified.

The scheduling algorithm is divided into three steps A, B, C.

Step A is the step during which the scheduler tries to allocate one slot for each $C_n(i)$, the allocated slots forming a cell train which is the closest possible in time of the earliest deadline of all cells of connection $C_n$. This step A is divided in several sub-steps which are represented by the flow chart of FIG. 4.

Each sub-step is schematically illustrated on FIG. 5 to FIG. 11 by means of an example wherein a new slot for the connection C, is to be allocated while slots for connections $C_k$, $C_l$, $C_m$ have already been allocated.

Step A

Figure 4:
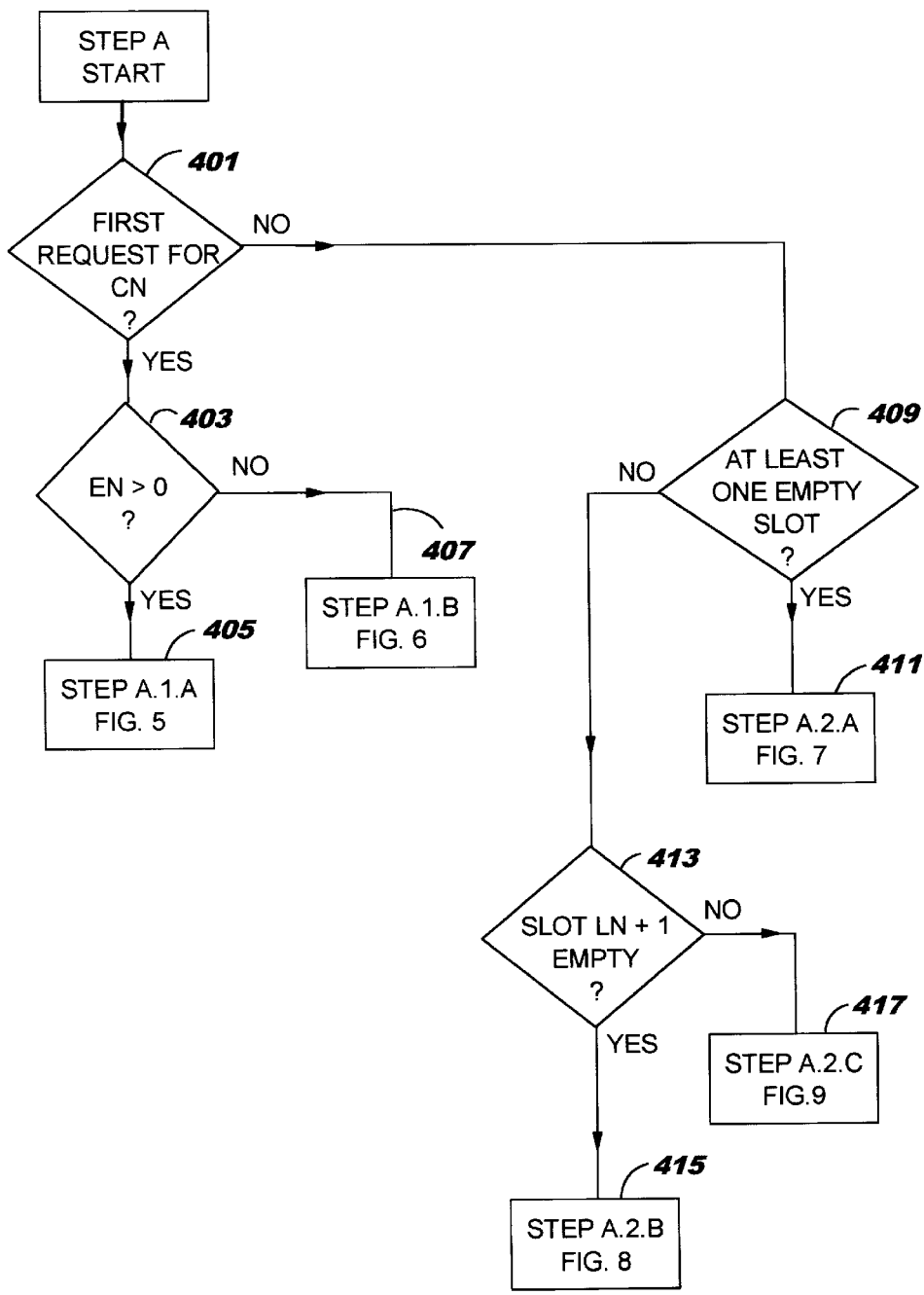
FIG. 4 is a flow chart representing all the possible sub-steps of STEP A implemented in the scheduling method of the invention.

In FIG. 4, when a request corresponding to cell $c_n(i)$, either for downlink transmission or for uplink contention-free transmission, is selected for service, the scheduler allocates one slot for the transmission of $c_n(i)$. Two cases have to be considered.

1. In step 401, the request is the first serviced request for connection $C_n$ in the current time frame. If all the slots in the interval $[D_n-\Phi, D_n^-]$ are empty, then these $\psi$+1 slots are allocated by the scheduler to cell cn(i) and the overhead. Otherwise, there are two sub-steps to be considered in step 403.

a) $E_n > \Phi$

In step 405, there are at least $\Phi$+1 empty slots in the interval $[1, D_n]$.

Figure 5:
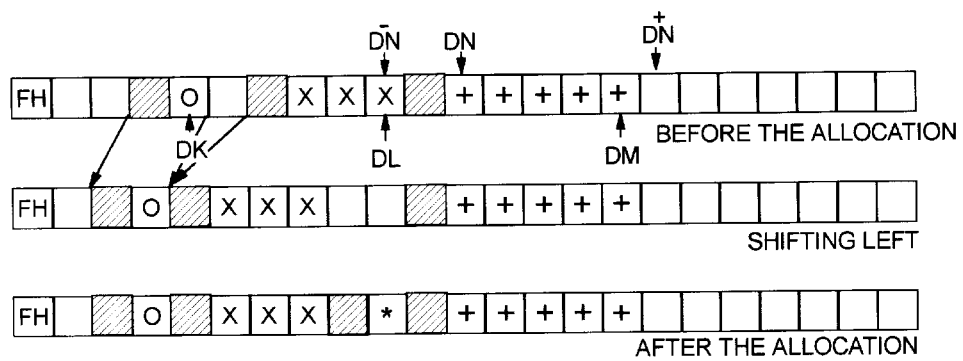
FIG. 5 to FIG. 9 are diagrams schematically representing the implementation of the scheduling method according to the invention for each of the sub-steps of STEP A.

From the definition of $D_n^-$, it can be proved that all $E_n$ empty slots are in the interval $[1, D_n^-]$. In this case, the algorithm has to free $\Phi$+1 positions, as close as possible, without splitting any existing cell train, to place the new ATM cell as shown in FIG. 5. These positions are $D_n^- - \Phi$ up to $D_n^-$. For instance, when $\Phi$ is equal to 1, all allocations between the two last empty slots and $D_n^-$ shift one position to the left and all allocations between the last empty slot and $D_n^-$ shift two positions to the left to leave $D_n^- -1$ and $D_n^-$ empty for the new allocation. Since the allocations move to the left, none of them exceeds its deadline.

b) $E_n \leq \Phi$

Figure 6:
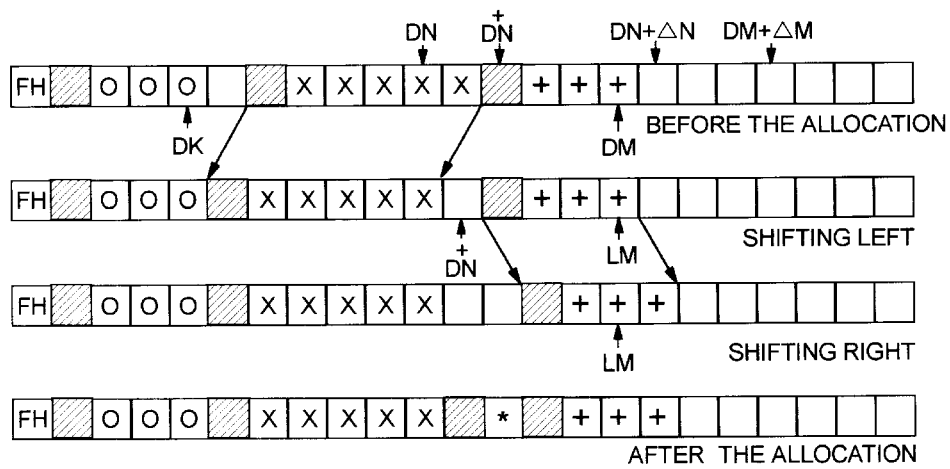

Returning to FIG. 4, there are $\Phi$ or less empty slots in the interval $[1, D_n^-]$ as shown in step 407. In this case, there is not enough available "free space" prior to the deadline to allocate slots for connection $C_n$. Therefore the allocation can only be done on the "right side" of the deadline, while ensuring that the introduced delay does not exceed the maximum "extended delay" as shown in FIG. 6. The proposed approach is first to fill the $E_n$ empty slots before the deadline $D_n$ by shifting to the left the allocations before $D_n^+$ and then start the allocation on the new position of $D_n^+$, ensuring that shifting to the right existing allocations, if needed, does not violate their maximum extended delays. Therefore the strategy consists in the following steps:

a. Verify that $D_n^+ + \Phi - E_n \leq D_n + \Delta_n$, to ensure that the maximum accepted delay of $C_n$ is not exceeded. If found false, no allocation is performed. For example, in FIG. 6, $D_n^+ + \Phi - E_n = 12 + 1 - 1 \leq 16 = D_n + \Delta_n$.

b. For all connections $C_i$ having allocations on the right of $D_n$, that need to be shifted to the right to make some space for the new allocation, verify that, after the shifting $L_i \leq D_i + \Delta_i$ for all connections. If this is not the case, even for one connection, no allocation is performed.

For example, in FIG. 6, $L_m = 16 \leq 19 = D_m + \Delta m$. Otherwise:

c. Allocations up to $D_n^+ - 1$ are moved to the left up to fill all the empty $E_n$ time slots, while allocations after $D_n^+ - 1$ are shifted to the right, to make $\Phi + 1$ slots available for the new allocation.

d. The allocation is performed starting at slot $D_n^+$ (it must be noted that the value of $D_n^+$ after step "b" differs from the value before step "b", as it has been decreased by a value $E_n$).

Figure 7:
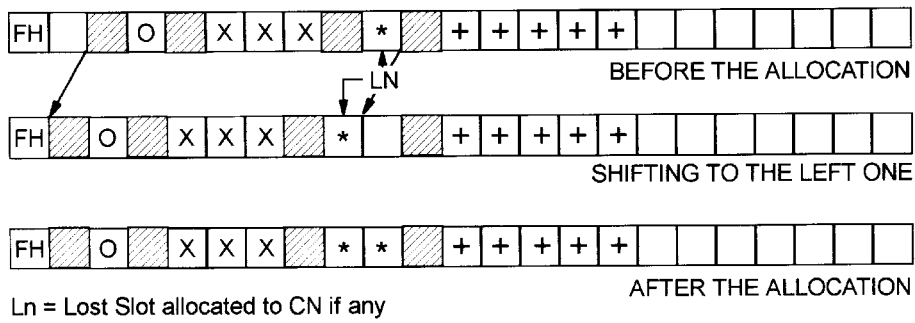
Figure 8:
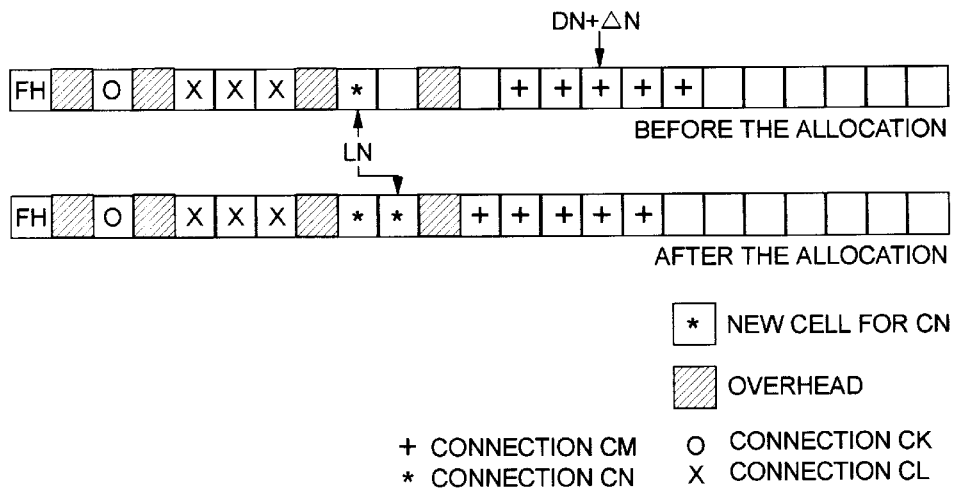
Figure 9:
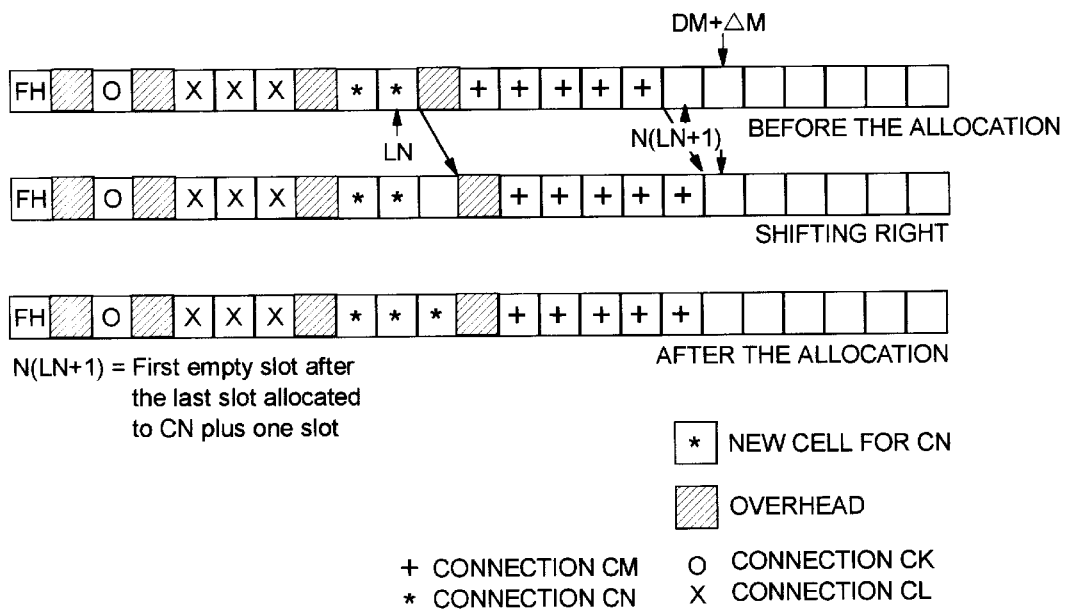

2. Returning to FIG. 4 and step 409, the request is not the first serviced request for connection $C_n$ in the current frame. There are three sub-steps.

a) In step 411, there is at least one empty slot in $[1, L_n]$. All allocations between the last empty slot before $L_n$ and $L_n$ shift one position to the left to leave $L_n$ empty for the new allocation as shown in FIG. 7. Moving to the left does not violate any deadline.

b) In step 413 there no empty slots in $[1, L_n]$ and the slot $L_n + 1$ is empty. In this case, the allocation is performed in slot $L_n + 1$ if $L_n + 1 \leq D_n + \Delta_n$ in step 415 and shown in FIG. 8, for example, $L_n + 1 = 8 + 1 \leq 13 = D_n + \Delta_n$. Otherwise, it is not performed.

c) In step 417, there are no empty slots in $[1, L_n]$ and the slot $L_n + 1$ is not empty, as shown in FIG. 9. In this case, the allocation can only be performed in slot $L_n + 1$ if all the connections occupying the slots up to the first empty slot have not yet reached their maximum "extended deadline" (defined as the sum of $D_i$ and $\Delta_i$ for each connection). The strategy consists of the following steps:

1. Check that the following relation is true, after shifting to the right by one position for all connections $C_i$ occupying slots in the interval $[L_n + 1, N(L_n + 1) - 1]$:

$$L_i \leq D_i + \Delta_i$$

If found false, even for only one connection, then no allocation is performed.

Otherwise:

2. Shift to the right by one position the previous allocations in the interval $[L_n + 1, N(L_n + 1) - 1]$ (this step frees the slot $L_n + 1$).

3. The Allocation is performed in slot $L_n + 1$.

Step B

Figure 10:
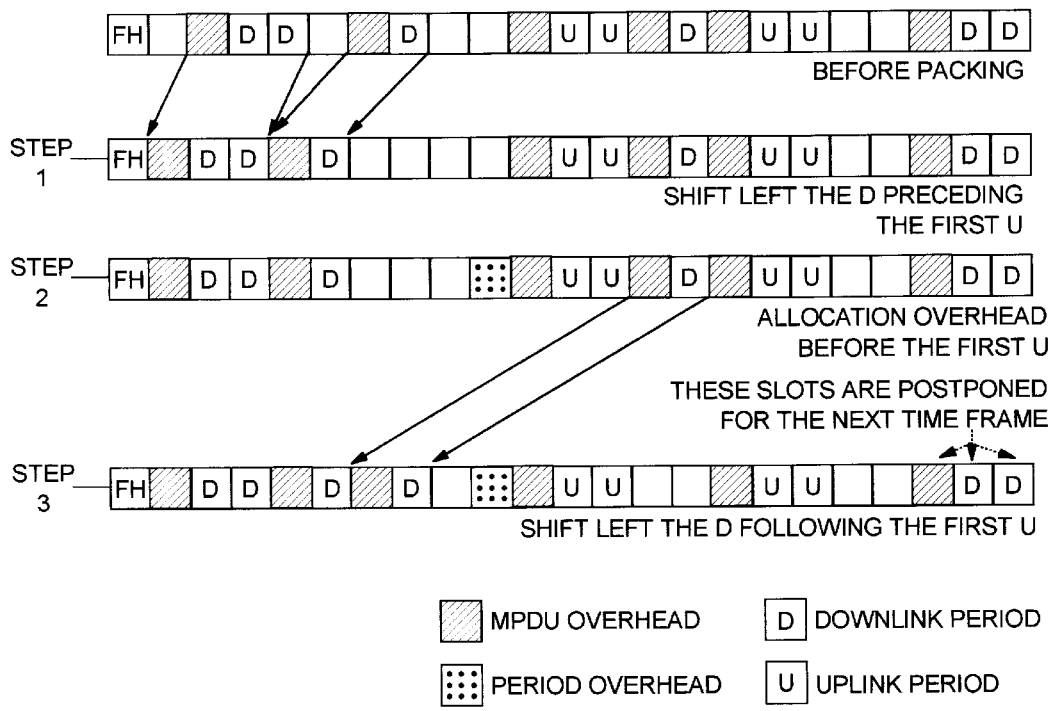
FIG. 10 is a diagram schematically representing the implementation of the scheduling method according to the invention in STEP B.

After step A has been completed, the second step consists in building the DOWN period of the time frame, as shown in FIG. 10.

This operation consists in three sub-steps, as follows.

1. When all requests have been processed, the scheduler packs as close to the beginning of the frame as possible, all allocations between the beginning of the frame and the first slot allocated to an uplink connection (clearly all these allocations correspond to downlink connections).

2. As a result of the former sub-step, some empty slots may be left before the first uplink slot. If this number of empty slots is equal to N, then a comparison is made between N and P:

If $N \geq P$, then the last P slots before the first uplink slot are allocated for the so-called "Period overhead".

If N<P, then the last P-N slots of the last downlink cell train preceding the first uplink slots are re-allocated to the Period overhead. If the resulting slot train is less than $\Phi + 1$ slots long, then this whole slot train must be de-allocated (to avoid keeping an incomplete MPDU).

It must be noted that stealing some slots of the last MPDU may not be the optimal strategy, depending on the traffic class of the corresponding connection. Another more complex approach would be to steal slots to the connection which is last sensitive to cell loss.

3. To the space left empty between the last downlink allocation and the period overhead, the algorithm tries to pack as much downlink allocations as possible by moving them to the left.

Note that when allocations are shifted to the left, a given cell train may be broken if not enough free slots are available for the whole cell train. In this case, the procedure must ensure that the number of shift allocations is at least equal to $\Phi + 1$ (otherwise it would result in a MPDU with an empty payload or even with an incomplete header).

Step C

Figure 11:
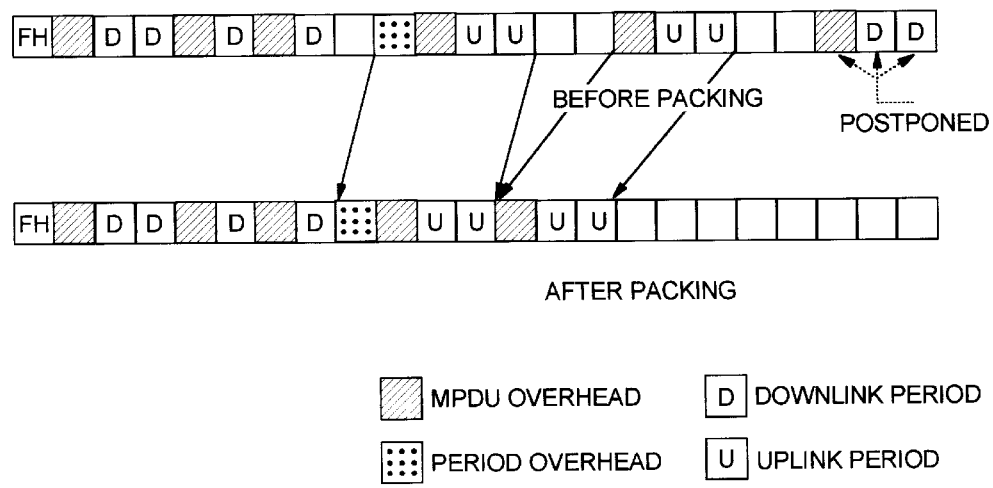
FIG. 11 is a diagram schematically representing the implementation of the scheduling method according to the invention in STEP C.

This step consists in building the UP period by shifting the slots(s) comprising the period overhead to the left to fill empty slot(s) following the DOWN period, and shifting the uplink allocation to the left just after the period overhead, as shown in FIG. 11. Of course, moving to the left does not result in any deadline violation. If some downlink allocations follow the UP period, they will be postponed to the next time frame (if they do not exceed the deadline).

Packing in steps B and C preserves the "work-conserving" property already mentioned since no slot are left empty.

At the end of the algorithm, added space composed of several slots are kept after the UP period in order to constitute the CONTENTION period.

Different aspects of the scheduling method can be modified and enhanced at the cost of some complexity, while remaining within the scope of the invention. Thus, in the embodiment described above, the deadline for uplink ATM cells is estimated according to the time of reception of the MPDU preceding the reception of a reservation request. This estimation is quite conservative, so that the real deadline may be later than estimated, potentially resulting in the absence of allocation for this connection, even if the real deadline is not exceeded. Another solution would consist of carrying some time stamp information along with the reservation request, so that the scheduler knows exactly when the uplink ATM cell was received for transmission in the MT. By using this timing information, the estimation is no longer needed, so that both the downlink and uplink traffic will be treated the same way as far as their deadline is concerned.

Another enhancement relates to the arrangement of a cell train to form the time frame. Indeed, in the preferred embodiment, the final arrangement of the cell train must respect the time frame structure where the downlink transmission always precedes the uplink transmission. This constraint may result in postponing the transmission of some cell trains in a subsequent time frame, for instance in a situation where the output of step A is a sequence of alternate DOWN and UP cell trains. As there is some overhead associated to each new time frame (the period during which the FH must be built and sent by the AP and then received and analysed by all the MTs.), it may lead to some situations where a given ATM cell will finally not be allocated for deadline reasons. One way to solve this problem is to allow interleaving of the UP and DOWN periods during the time frame, taking into account both the overhead associated to the turn-around time of the physical channel (lasting P slots) and the overhead associated to the time frame (the FH period lasting F time slots). This results in building a period interleaving if and only if it allows to issue a cell train that would be aged out if transmitted in the next time frame to come. This condition is fulfilled if the following relation is found true for a connection $C_n$:

$$L_n+P<D_n+\Delta_n<L_n+F.$$

Though the scheduling method of the invention is appropriate to be used by the master scheduler of an Access Point, it is clear that it can also be used by the slave scheduler in each Mobile Terminal to determine the ordering of the uplink traffic which is to be transmitted during the UP period allocated by the master scheduler.

It must be noted that the scheduling method of the invention is well adapted to be implemented when the network based upon a synchronous transfer mode is a wireless network such as a radio network. However, it is in the scope of the invention to implement the scheduling method in any other network having characteristics and constraints similar to the ones of a wireless network.

What is claimed is:

1. A method comprising the steps of:

defining a sequence of time frames for exchanging data between nodes in an asynchronous network and nodes in a synchronous network;

dividing each of the defined time frames into a plurality of time slots;

requesting time slots within a time frame for carrying data cells over connections between the synchronous and asynchronous networks;

allocating slots within a time frame to the requests for time slots according to cell deadlines which are proportional to a transmission delay of the connection over which the data cells are to be carried, said allocation proceeding in order of a connection priority and continuing until one of an exhaustion of all requests for time slots and an exhaustion of all time slots within the time frame occurs;

partitioning each time frame into a down period for contention-free downlink transmission of data from the asynchronous network to the synchronous network, an up period for contention-free uplink transmission of data from the synchronous network to the asynchronous network, and a contention period for contention-based uplink transmission of data from the synchronous network to the asynchronous network;

generating slot maps describing the partitioning of time frames into up, down, and contention periods and describing the allocation of time slots within the time frames; and exchanging data between the synchronous and asynchronous networks in time frames according to each time frame's slot map.

2. The method according to claim 1, wherein in said exchanging step at least one of the nodes in the synchronous network is a concentrator point interfacing the synchronous network with a second asynchronous network.

3. The method according to claim 1, wherein said step of allocating slots comprises the steps of determining whether a request for a time slot within a time frame for a cell $c_n(i)$ of a group of cells $c_n$ requesting time slots for a connection $C_n$ is a first request for the connection $C_n$ in the time frame, and if so determining whether the number of free slots $E_n$ in an interval, where 1 is a slot following a frame header for the time frame and where $D_n$ is a slot corresponding to an earliest deadline of all deadlines for the group of cells $c_n$, is greater than a number of time slots $\Phi$ reserved for the transmission of a header which together with at least one cell of the group of cells $c_n$ forms a data unit for the connection $C_n$, and if so shifting any data units allocated to slots to the left of $D_n$ but not occupying $D_n$ ($\Phi$+1) positions to the left to leave ($\Phi$+1) empty slots as close to $D_n$ as possible, then allocating one of the emptied slots to the cell $c_n(i)$ and the remaining $\Phi$ emptied slots to the header forming a data unit for the connection $C_n$ in the time frame.

4. The method according to claim 3, wherein if the number of free slots $E_n$ in the interval [1, $D_n$] is less than or equal to $\Phi$, said step of allocating slots further comprises the steps of determining if the number of free slots in an interval [1, $(D_n+\Delta_n)$], where $(D_n+\Delta_n)$ is a slot corresponding to a maximum authorized deadline for the group of cells $c_n$ is greater than $\Phi$, and if so determining whether shifting any data units allocated to slots to the right of $D_n$ but not occupying $D_n$ ($\Phi$+1–$E_n$) slots to the right will exceed an maximum authorized deadline associated with the data units to be shifted, and if it does not shifting an data units allocated to slots to the left of $D_n$ and an data unit occupying $D_n E_n$ slots to the left, then shifting any data units allocated to slots to the right of $D_n$ but not occupying $D_n$ ($\Phi$+1–$E_n$) slots to the right, so as to leave ($\Phi$+1) empty slots as close to $D_n$ as possible, then allocating one of the emptied slots to the cell $c_n(i)$ and the remaining $\Phi$ emptied slots to the header forming a data unit for the connection $C_n$ in the time frame.

5. The method according to claim 4, wherein if the request for a cell $c_n(i)$ is not a first request for the connection $C_n$ in the time frame, said step of allocating slots further comprises the steps of determining if there is at least one empty slot to the left of the data unit for the connection $C_n$ in the time frame, and if so shifting any data units allocated to slots between an empty slot nearest and to the left of the data unit for the connection $C_n$ and the data unit for the connection $C_n$ itself one slot to the left, then allocating the cell $c_n(i)$ to the now empty slot following the data unit for the connection $C_n$, determining whether the slot following the data unit for the connection $C_n$ is empty when there are no empty slots to the left of the data unit for the connection $C_n$ in the time frame, and if so allocating cell $c_n(i)$ to the empty slot following the data unit for the connection $C_n$ unless doing so will cause the allocation of cell $c_n(i)$ to exceed the maximum authorized deadline for the group of cells $c_n$.

6. The method of claim 5, wherein if there are no empty slots to the left of the data unit for the connection $C_n$ and if the slot following the data unit for connection $C_n$ is not empty, said step of allocating slots further comprises the steps of determining if any cells allocated to slots up to a first empty slot following the frame header have reached their respective maximum authorized deadlines, and if they have not shifting one position to the right any allocations between the data unit for the connection $C_n$ and the first empty slot following the frame header, so as to leave empty the slot following the data unit for the connection $C_n$, then allocating cell $c_n(i)$ to the empty slot following the data unit for the connection $C_n$.

7. The method of claim 1, wherein in said partitioning step, the time frames are further partitioned into additional interleaved down and up periods for contention-free downlink and uplink transmission, the additional interleaved periods being followed by a contention period for contention-based uplink transmission.

8. The method of claim 7, wherein the asynchronous networks are ATM networks and the synchronous network is a wireless network.

9. The method of claim 1, wherein in said requesting step, requests for time slots for sending data cells from the asynchronous network to the synchronous network correspond to the arrival time at an access point linking the synchronous and asynchronous networks of cells sent from nodes in the asynchronous network.

10. The method of claim 1, wherein in said requesting step, requests for time slots for sending data cells from the synchronous network to the asynchronous network are derived at an access point linking the synchronous and asynchronous networks from a service class of the connection over which the data cells are to be carried.

11. The method of claim 1, wherein in said requesting step, requests for time slots for sending data cells from the synchronous network to the asynchronous network are carried in data units sent from nodes in the synchronous network and received at an access point linking the synchronous and asynchronous networks.

12. The method of claim 9, wherein in said allocating step, deadlines for cells requesting time slots for transmission from the asynchronous network to the synchronous network are derived from the arrival time of the cells at the access point.

13. The method of claim 10, wherein in said allocating step, deadlines for cells requesting time slots for transmission from the synchronous network to the asynchronous network are derived from an arrival time of a cell preceding a request for a time slot derived at the access point.

14. The method of claim 11, wherein in said allocating step, deadlines for cells requesting time slots for transmission from the synchronous network to the asynchronous network are derived from an arrival time of a cell preceding a request for a time slot carried in a data unit and received at the access point.

15. The method of claim 11, wherein in said allocating step, deadlines for cells requesting time slots for transmission from the synchronous network to the asynchronous network are derived from an arrival time of the cells in an output queue of the nodes of the synchronous network, the arrival time being stored in a time stamp and carried in a reservation request sent from the synchronous network to the access point.

16. The method of claim 1, wherein said partitioning step comprises the steps of packing all allocations between the frame header and a left-most uplink data unit as close to the beginning of the time frame as possible;

determining if the number of empty time slots N immediately preceding the left-most uplink data unit is greater than or equal to a number of time slots P reserved for a period overhead;

reserving P slots immediately preceding the left-most uplink data unit for the period overhead if P is greater than or equal to N;

reallocating (P-N) slots immediately preceding the left-most uplink data unit to the period overhead if N is less than P, and if said reallocating results in a data unit having Φ slots or less, then deallocating that data unit from the time frame;

packing downlink data units allocated to slots to the right of the period overhead and any portions of data units greater than Φ slots allocated thereto into any empty slots immediately preceding the period overhead;

packing all allocations between the period overhead and any downlink data unit following the period overhead as close to the period overhead as possible, then deallocating any such downlink data unit following the period overhead; and reserving a plurality of slots following the last uplink data unit in the time frame for contention-based uplink transmission of data from the asynchronous network to the synchronous network.

17. A system comprising:

an asynchronous network including at least one asynchronous node;

a synchronous network including a plurality of synchronous nodes;

means for defining a sequence of time frames for exchanging data between nodes in the asynchronous network and nodes in the synchronous network;

means for dividing each of the defined time frames into a plurality of time slots;

means for requesting time slots within a time frame for carrying data cells over connections between the synchronous and asynchronous networks;

means for allocating slots within a time frame to the requests for time slots according to cell deadlines which are proportional to a transmission delay of the connection over which the data cells are to be carried, said allocation proceeding in order of a connection priority and continuing until one of an exhaustion of all requests for time slots and an exhaustion of all time slots within the time frame occurs;

means for partitioning each time frame into a down period for contention-free downlink transmission of data from the asynchronous network to the synchronous network, an up period for contention-free uplink transmission of data from the synchronous network to the asynchronous network, and a contention period for contention-based uplink transmission of data from the synchronous network to the asynchronous network;

means for generating slot maps describing the partitioning of time frames into up, down, and contention periods and describing the allocation of time slots within the time frames; and means for exchanging data between the synchronous and asynchronous networks in time frames according to each time frame's slot map.

18. An article of manufacture, comprising:

a processor usable medium having a readable program embodied therein for exchanging data between a synchronous network and an asynchronous network, wherein the processor readable program when executed on the processor causes the processor to define a sequence of time frames for exchanging data between nodes in an asynchronous network and nodes in a synchronous network;

divide each of the defined time frames into a plurality of time slots;

request time slots within a time frame for carrying data cells over connections between the synchronous and asynchronous networks;

allocate slots within a time frame to the requests for time slots according to cell deadlines which are proportional to a transmission delay of the connection over which the data cells are to be carried, said allocation proceeding in order of a connection priority and continuing until one of an exhaustion of all requests for time slots and an exhaustion of all time slots within the time frame occurs;

partition each time frame into a down period for contention-free downlink transmission of data from the asynchronous network to the synchronous network, an up period for contention-free uplink transmission of data from the synchronous network to the asynchronous network, and a contention period for contention-based uplink transmission of data from the synchronous network to the asynchronous network;

generate slot maps describing the partitioning of time frames into up, down, and contention periods and describing the allocation of time slots within the time frames; and exchange data between the synchronous and asynchronous networks in time frames according to each time frame's slot map.

19. The article of manufacture of claim 18, wherein the processor readable program when executed on the processor further causes the processor to determine whether a request for a time slot within a time frame for a cell $c_n(i)$ of a group of cells $c_n$ requesting time slots for a connection $C_n$ is a first request for the connection $C_n$ in the time frame, and if so determine whether the number of free slots $E_n$ in an interval $[1, D_n]$, where 1 is a slot following a frame header for the time frame and where $D_n$ is a slot corresponding to an earliest deadline of all deadlines for the group of cells $c_n$, is greater than a number of time slots $\Phi$ reserved for the transmission of a header which together with at least one cell of the group of cells $c_n$ forms a data unit for the connection $C_n$, and if so shift any data units allocated to slots to the left of $D_n$ but not occupying $D_n$ ($\Phi$+1) positions to the left to leave ($\Phi$+1) empty slots as close to $D_n$ as possible, then allocate one of the emptied slots to the cell $c_n(i)$ and the remaining $\Phi$ emptied slots to the header forming a data unit for the connection $C_n$ in the time frame.

20. The article of manufacture of claim 19, wherein if the number of free slots $E_n$ in the interval $[1, D_n]$ is less than or equal to $\Phi$, the processor readable program when executed on the processor further causes the processor to determine if the number of free slots in an interval $[1, (D_n+\Delta_n)]$, where $(D_n+\Delta_n)$ is a slot corresponding to a maximum authorized deadline for the group of cells $c_n$, is greater than $\Phi$, and if so determine whether shifting any data units allocated to slots to the right of $D_n$ but not occupying $D_n$ ($\Phi$+1$-E_n$) slots to the right will exceed any maximum authorized deadline associated with the data units to be shifted, and if it does not shift any data units allocated to slots to the left of $D_n$ and any data unit occupying $D_n E_n$ slots to the left, then shifting any data units allocated to slots to the right of $D_n$ but not occupying $D_n$ ($\Phi$+1$-E_n$) slots to the right, so as to leave ($\Phi$+1) empty slots as close to $D_n$ as possible, then allocate one of the emptied slots to the cell $c_n(i)$ and the remaining $\Phi$ emptied slots to the header forming a data unit for the connection $C_n$ in the time frame.

21. The article of manufacture of claim 20, wherein if the request for a cell $c_n(i)$ is not a first request for the connection $C_n$ in the time frame, the processor readable program when executed on the processor further causes the processor to determine if there is at least one empty slot to the left of the data unit for the connection $C_n$ in the time frame, and if so shifting any data units allocated to slots between an empty slot nearest and to the left of the data unit for the connection $C_n$ and the data unit for the connection $C_n$ itself one slot to the left, then allocating the cell $c_n(i)$ to the now empty slot following the data unit for the connection $C_n$, determine whether the slot following the data unit for the connection $C_n$ is empty when there are no empty slots to the left of the data unit for the connection $C_n$ in the time frame, and if so allocating cell $c_n(i)$ to the empty slot following the data unit for the connection $C_n$ unless doing so will cause the allocation of cell $c_n(i)$ to exceed the maximum authorized deadline for the group of cells $c_n$.

22. The article of manufacture of claim 21, wherein if there are no empty slots to the left of the data unit for the connection $C_n$ and if the slot following the data unit for connection $C_n$ is not empty, the processor readable program when executed on the processor further causes the processor to determine if any cells allocated to slots up to a first empty slot following the frame header have reached their respective maximum authorized deadlines, and if they have not shift one position to the right any allocations between the data unit for the connection $C_n$ and the first empty slot following the frame header, so as to leave empty the slot following the data unit for the connection $C_n$, then allocate cell $c_n(i)$ to the empty slot following the data unit for the connection $C_n$.

23. The article of manufacture of 18, wherein the processor readable program when executed on the processor further causes the processor to pack all allocations between the frame header and a left-most uplink data unit as close to the beginning of the time frame as possible;

determine if the number of empty time slots N immediately preceding the left-most uplink data unit is greater than or equal to a number of time slots P reserved for a period overhead;

reserve P slots immediately preceding the left-most uplink data unit for the period overhead if P is greater than or equal to N;

reallocate (P-N) slots immediately preceding the left-most uplink data unit to the period overhead if N is less than P, and if said reallocating results in a data unit having Φ slots or less, then deallocating that data unit from the time frame;

pack downlink data units allocated to slots to the right of the period overhead and any portions of data units greater than Φ slots allocated thereto into any empty slots immediately preceding the period overhead;

pack all allocations between the period overhead and any downlink data unit following the period overhead as close to the period overhead as possible, then deallocating any such downlink data unit following the period overhead; and reserve a plurality of slots following the last uplink data unit in the time frame for contention-based uplink transmission of data from the asynchronous network to the synchronous network.

24. The article of manufacture of claim 18, wherein the processor readable program when executed on the processor further causes the processor to further partition the time frames into additional interleaved down and up periods for contention-free downlink and uplink transmission, the additional interleaved periods being followed by a contention period for contention-based uplink transmission.

\* \* \* \* \*